No. 693,563. Patented Feb. 18, 1902.
I. E. PALMER.
SPREADER CLIP FOR HAMMOCKS.
(Application filed July 25, 1901.)
(No Model.)
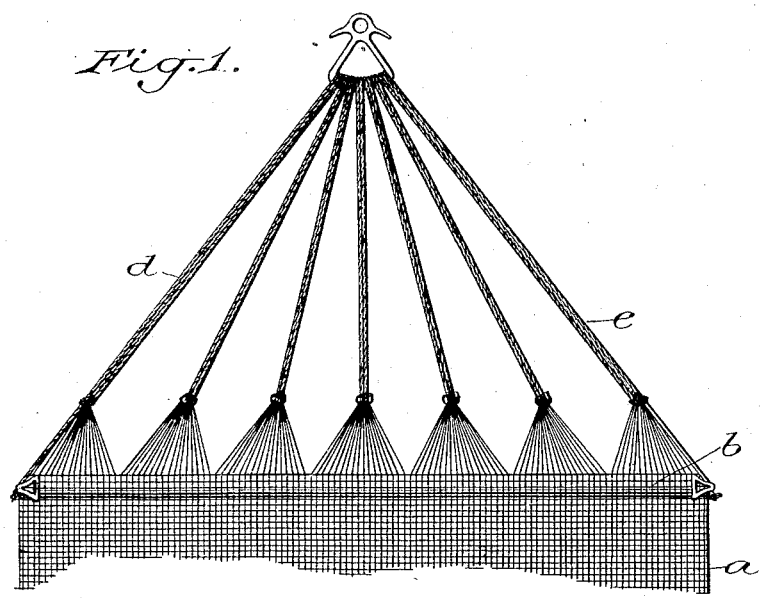
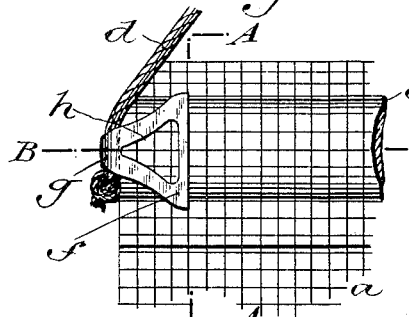
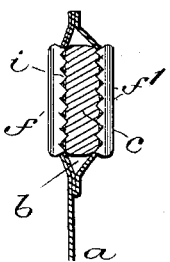
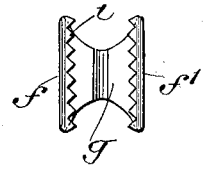
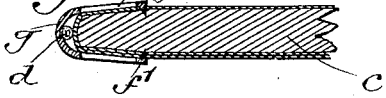
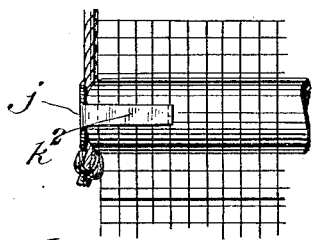
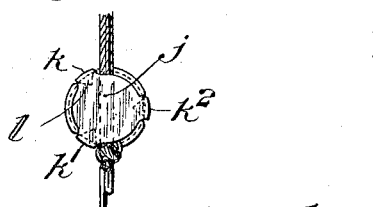
Witnesses:-
C. S. Sundgren
George Barry Jr.
Inventor:-
Isaac E. Palmer
By Brown & Seward
his Attorneys

UNITED STATES PATENT OFFICE.

ISAAC E. PALMER, OF MIDDLETOWN, CONNECTICUT.

SPREADER-CLIP FOR HAMMOCKS.

SPECIFICATION forming part of Letters Patent No. 693,563, dated February 18, 1902.

Application filed July 25, 1901. Serial No. 69,661. (No model.)

*To all whom it may concern:*

Be it known that I, ISAAC E. PALMER, a citizen of the United States, and a resident of Middletown, in the county of Middlesex and State of Connecticut, have invented a new and useful Spreader-Clip for Hammocks, of which the following is a specification.

My invention relates to a spreader-clip for hammocks, with the object in view of providing simple and effective means for preventing the spreader from pushing through the opposite ends of the spreader-pocket when the hammock is placed under strain, as in use, and at the same time providing a simple and efficient fastening means for the outer suspension-cords.

A practical embodiment of my invention is represented in the accompanying drawings, in which—

Figure 1 is a plan view of the end of the hammock, showing the spreader and suspension-cords in position, with the clips at the opposite ends of the spreader, as in use. Fig. 2 is an enlarged partial plan view of one end of the spreader, showing the parts in immediate proximity thereto. Fig. 3 is a transverse section along the line A A of Fig. 2 looking toward the left. Fig. 4 is a section along the longitudinal axis of the spreader in the plane of the line B B of Fig. 2. Fig. 5 is a view in detail of the clip, showing it in side elevation. Fig. 6 is a similar view showing the clip open and in face elevation. Fig. 7 is a similar view showing the clip in edge elevation. Fig. 8 is a partial plan view showing the end of the spreader with a modified form of clip attached thereto, and Fig. 9 is an outside end view of the same.

The hammock-body is denoted by $a$, the spreader-pocket by $b$, the spreader by $c$, and the outside suspension-cords leading to the opposite ends of the spreader and located in the pocket $b$ are denoted, respectively, by $d$ and $e$.

The clip, which is intended to embrace the opposite sides of the end of the spreader and hold the material which forms the hammock-pocket in position on the spreader, as well as holding the suspension-cord in position, is preferably made of malleable metal—such, for example, as malleable iron—and consists of a pair of jaws $f f'$, formed integral with the body $g$, which is made U-shaped in cross-section, as clearly shown in Figs. 4 and 7. In the preferred form the bight of the body portion $g$ is made comparatively narrow and the jaws about the length of the width of the spreader, the intermediate portion of the body of the clip between the jaw and the bight being cut away, as shown at $h$, to form skeleton sides. The edges of the jaws are each provided with one or more teeth, in the present instance a series of teeth $i$ being shown on the edge of each jaw for the purpose of entering the wood on the opposite sides of the spreader when the parts are assembled.

The clip is formed with its jaws spread apart, as shown in Fig. 6, sufficient to clamp between them the end of the spreader with the pocket material thereon, and after the clip has been placed on the end of the spreader, as shown in Fig. 2, with the suspension-cord $d$ passing through its bight, between it and the end of the spreader, it may be secured in position by pressing the jaws together into the position shown in Fig. 3, with their teeth inserted in the opposite sides of the wood of the spreader. This serves to hold the pocket material firmly clamped to the opposite sides of the spreader, thereby obviating the tendency of the end of the spreader to work its way through the pocket material when the hammock is under strain, as in use.

The form of spreader shown in Figs. 1 to 7, inclusive, is oblong in cross-section. When made circular in cross-section, as shown in Figs. 8 and 9, the clip may be formed with three jaws instead of two, the said jaws being located at the ends of three arms or prongs, which extend along the outside of the spreader and are formed integral with a body portion in the form of a cap, which rests against the end of the spreader and serves to clamp the suspension cord between it and the end of the spreader. This modified form of clip has its end portion denoted by $j$, its three prongs by $k$ $k'$ $k^2$, and the free ends of the prongs or arms $k$ $k'$ $k^2$ are provided with jaws each having, in the present instance, a single tooth $l$. (See dotted lines, Fig. 9.)

It is obvious that the clip may assume other forms than those herein shown without departing from the spirit and scope of my invention. Hence I do not wish to limit myself strictly to the structure herein set forth; but,
What I claim is—

1. The combination with the hammock-body provided with a pocket and a spreader located within the pocket, of a clip adapted to span the end and extend over the sides of the spreader, the said clip being formed of malleable metal whereby its parts, extending over the sides of the spreader, may be forced into operative adjustment to clamp the wall of the pocket between it and the spreader, substantially as set forth.

2. The combination with the spreader-pocket in the hammock-body, a spreader located therein and a suspension-cord leading over the end of the spreader, of a clip comprising a body portion arranged to span the end of the spreader and clamp the suspension-cord between it and the end of the spreader and with side portions arranged to extend over the sides of the spreader and clamp the pocket-wall between it and the spreader, substantially as set forth.

In testimony that I claim the foregoing as my invention I have signed my name, in presence of two witnesses, this 24th day of June, 1901.

ISAAC E. PALMER.

Witnesses:
FREDK. HAYNES,
C. S. SUNDGREN.